United States Patent Office 3,319,592
Patented May 16, 1967

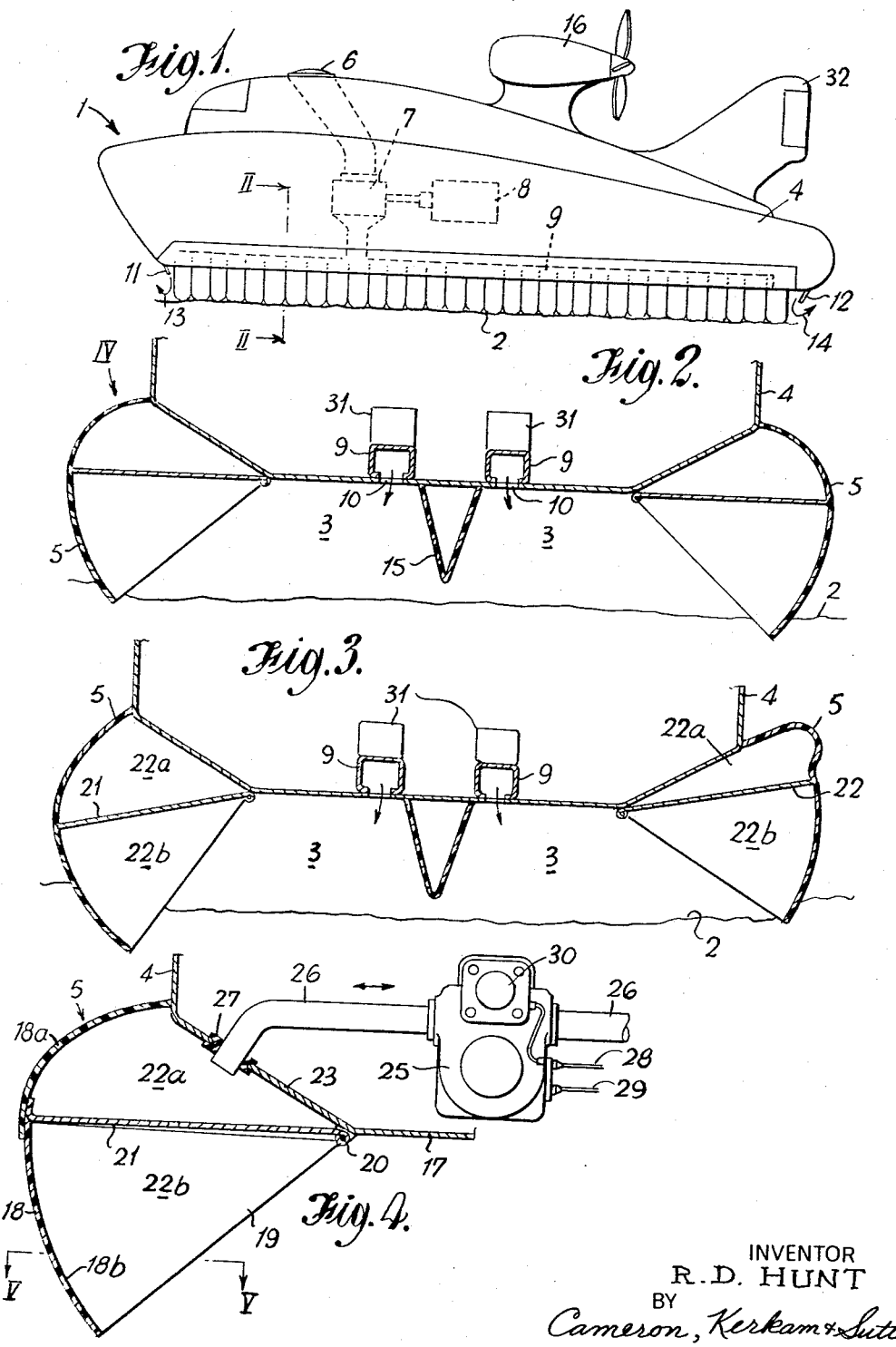

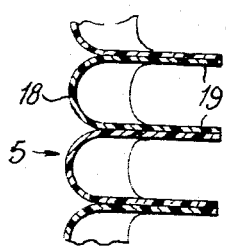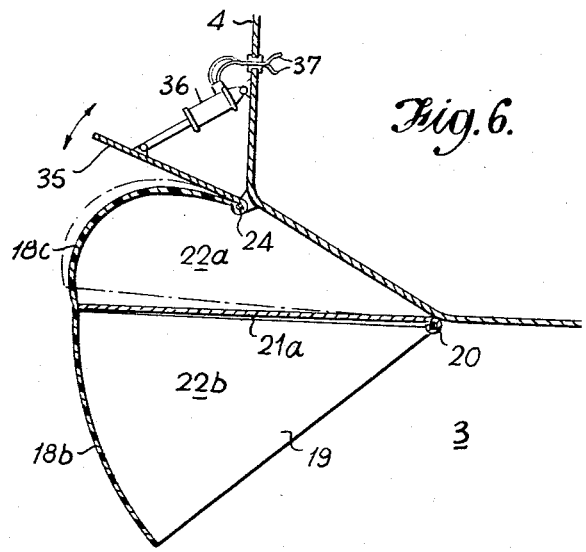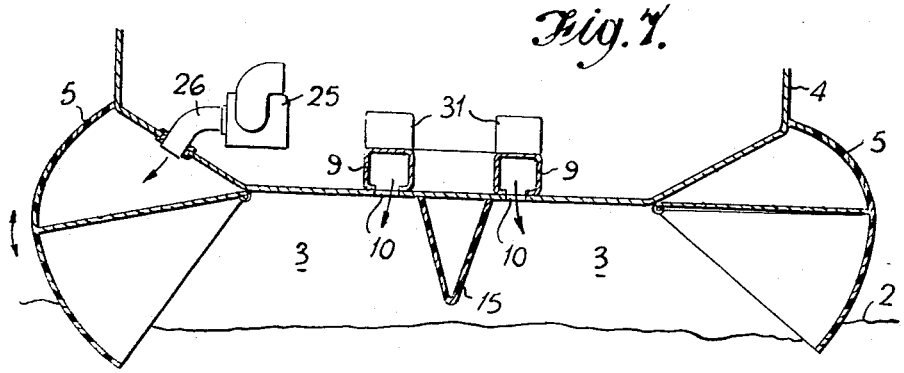

3,319,592
GAS-CUSHION VEHICLES FOR OPERATION OVER WATER
Rowland Delville Hunt, Hythe, Southampton, England, assignor to Hovercraft Development Limited, London, England, a British company
Filed July 21, 1965, Ser. No. 473,715
Claims priority, application Great Britain, July 24, 1964, 29,724/64
6 Claims. (Cl. 114—67)

This invention relates to gas-cushion vehicles for operation over water, that is to say, to vehicles of the kind which, in operation, are supported above the surface of water by at least one cushion of pressurised gas formed and contained beneath the vehicle, and the invention is concerned with means for manoeuvring such vehicles.

A gas-cushion vehicle can be manoeuvred over water by rolling movements initiated by swivel-operation of airscrew units disposed above the centre of gravity of the vehicle or by movement of similarly disposed aerodynamic surfaces, but these methods have limitations for example, they can be negatived by adverse wind forces.

The vehicle-supporting gas-cushion or cushions may be contained, at least in part, by flexible or flexibly attached wall structures projecting down below the sides of the vehicle body and towards the water beneath the vehicle. Under operating conditions, the lower extremities of the wall structure sometimes tend to dip into the water beneath the vehicle and so create a certain amount of drag forces. Contact between water and wall structures can still occur from time to time even with wall structures intended (for example, by means of fluid curtains issuing from the edges of the structures) to be clear of the water under operating conditions. The invention makes use of these otherwise unwanted drag forces in order to manoeuvre a vehicle and hence, according to the invention, a gas-cushion vehicle for operation over water, wherein, in operation, the cushion is contained at least in part, by flexible or flexibly attached wall structures projecting downwardly below the sides of the vehicle body, towards the water, is provided with actuating means whereby at least the lower part of the wall structure on one side of the vehicle body may be moved towards and away from the water to vary the drag of the wall part, whereby asymmetric drag created by the differential immersion of the wall structures applies a turning force on the vehicle.

In one preferred arrangement, the fore and aft ends of the cushion space beneath the vehicle are contained, at least in part, by fluid curtains and the cushion space is divided longitudinally by compartmentation means, such as the compartmentation means disclosed in the copending application of Denys Stanley Bliss, Ser. No. 434,003, filed Feb. 19, 1965. This arrangement can give the vehicle a roll-stiffness or self-storing characteristic.

An embodiment of the invention will now be described by way of example with reference to the accompanying drawings wherein:

FIGURE 1 is a side view of a vehicle,
FIGURE 2 is a section on the lines II—II of FIGURE 1,
FIGURE 3 is similar to FIGURE 2 and illustrates the vehicle of FIGURE 1 being manoeuvred,
FIGURE 4 is an enlargement, with added detail, of the wall structure indicated generally at IV in FIGURE 2,
FIGURE 5 is a section, taken on the lines V—V of FIGURE 3 is similar to FIGURE 2 and illustrates
FIGURES 6 and 7 are views similar to those of FIGURES 4 and 2 respectively and illustrate modifications hereof.

Referring first to FIGURES 1 and 2, a gas-cushion vehicle 1 is supported above the surface 2 of water by a cushion 3 of pressurised air formed and contained beneath the body 4 of the vehicle, the port and starboard sides of the cushion 3 being contained by a pair of flexible wall structures 5 projecting downwardly beneath the sides of the vehicle body 4 to dip into the water 2 beneath. The vehicle 1 is provided with wall structure actuating means (as described hereinafter) whereby the wall structure 5 on one side of the vehicle body 4 is moved away from the water (see FIGURE 3) whilst the wall structure 5 on the other side of the vehicle body is moved towards the water, whereby the asymmetric drag created by the differential immersion of the lower parts of the wall structures 5 applies a turning force on the vehicle.

In further detail, air for the formation of the cushion 3 is drawn in through an intake 6 from the atmosphere surrounding the vehicle 1, is compressed by a compressor 7 driven by an engine 8, and, after pressurisation, is fed to a pair of longitudinal ducts 9 disposed in the vehicle body 4 and having ports 10 (FIGURE 2) open to the cushion space beneath the vehicle body. Part of the pressurized air forms the cushion 3 and the remainder flows through fore and aft nozzles 11, 12 of flexible material to form air curtains 13, 14 which combine with the nozzles in containing the fore and aft ends of the cushion 3. A convenient form of nozzle is contained in one of the embodiments of gas cushion-containing flexible walls disclosed in the copending application of Denys Stanley Bliss, Ser. No. 267,695, filed Mar. 25, 1963, now abandoned, and in the continuation-in-part thereof, Ser. No. 566,948, filed July 21, 1966. The port and starboard sides of the cushion 3 are contained by the wall structures 5. The cushion 3 is divided into port and starboard cushion cells longitudinally by a central wall 15 in the manner disclosed in the above mentioned Bliss application Ser. No. 434,003. The vehicle 1 is propelled over the water 2 by an airscrew unit 16. A small rudder-control unit 32 may be provided to assist turning the vehicle 1.

Referring now to FIGURE 4, each wall structure 5 is basically similar to the type disclosed in the co-pending application of Denys Stanley Bliss, Ser. No. 439,651, filed Mar. 15, 1965, having an external profile which extends outwardly and downwardly from the side of the vehicle body 4 from a point above the bottom surface 17 thereof, and then changes in direction so as to incline inwards towards the cushion 3 and finally terminates at a level below the bottom surface 17.

With reference now to FIGURE 5 also, each wall structure 5 is made of rubberised fabric and has the characterising features disclosed in the above-mentioned Bliss application Ser. Nos. 267,695 and 566,948, that is, it comprises a plurality (see FIGURE 1) of separate downwardly projecting flexible wall members, each comprising an outer portion 18 constrained to resist outward deflection by cushion pressure and has two side or tie portions 19 extending inwardly from the outer portion 18 into the space bounded by the wall structure 5. The inner extremities of the side portions 19 are attached to the bottom surface 17 of the vehicle body 4 at 20.

Each wall structure 5 is divided into upper and lower spaces 22a, 22b, by a horizontal partition 21 of rigid construction. Space 22b, is open to the cushion 3 but space 22a is closed by the associated outer portion 18a, the partition 21 and a tapered portion 23 of the vehicle body 4 which connects the bottom surface 17 with the side of the body 4.

The parts of the outer portion 18 which bound the spaces 22a, 22b are made of rubberised fabric having differing properties. The upper part 18a of the portion 18 which bounds the space 22a is made of a rubber-nylon fabric which is extensible and the lower part 18b of the portion 18 which bounds the space 22b is made of a neoprene-nylon fabric which is relatively inextensible.

The spaces 22a of the wall structures 5 on one side of the vehicle 1 are connected to the spaces 22a of the structures 5 on the other side through an air compressor unit 25 and branch lines 26 connected thereto penetrate the portions 23 of the vehicle body 4 and are sealed to the body by rubber seals 27. Operation of the compressor unit 25 is controlled by the pilot of the vehicle through electrical signal lines 28, 29 and included in the control system is a change-over valve device 30 which allows the compressor to transfer air from the spaces 22a on one side of the vehicle to the spaces 22a on the other side thereof. The valve device 30 also incorporates an air flow bypass unit.

In operation, with the vehicle 1 in the attitude illustrated in FIGURE 2, that is, with opposite-facing wall structures 5 dipping into the water 2 a substantially identical amount, the compressor 25 is running but the vehicle pilot has his turn controls set so that the bypass unit of the valve device 30 ensures there is no transfer of air through the branch lines 26. In this situation, the pressures in spaces 22a, 22b are equal all round, with the air pressures within the spaces 22b at cushion pressure. To make a turn, however, say to starboard, the vehicle pilot operates his controls so that signals are now transmitted through the lines 28, 29 which make the compressor 25 transfer air from the spaces 22a on the port side of the vehicle to the corresponding spaces on the starboard side thereof.

The pressurised air inflowing to the starboard-disposed spaces 22a extends the bounding portions 18a and rotates the associated partitions 21 downwardly, about the position 20 and against pressure of the cushion 3, so that the lower portions 18b of the starbound-disposed wall structures 5 are immersed deeper into the water 2. Simultaneously, the reduction of air pressure in the port-disposed spaces 22a allows pressure of the cushion 3 to overcome pressure in said spaces 22 and rotates the associated partitions 21 upwardly (see FIGURE 3), about the positions 20, so as to reduce the degree of immersion of the port-disposed 20, so as to reduce the degree of immersion of the port-disposed wall structures 5.

The port and starboard differential immersion of the wall structures 5 gives rise to an assymmetric drag which creates a turning force on the vehicle 1, at least assisting the vehicle to be turned to starboard. The wall structures 5 have a vertical cross-section such that their immersed cross-section increases substantially for a small increase in immersion.

To make a turn to port, the above-described operations are reversed. Compartmenting the cushion 3 and at least partly containing the cushion ends with air curtains gives the vehicle 1 a roll-stiff or self-restoring characteristic which assists the turn controls of the vehicle in returning the vehicle to its original attitude. This results from a righting or restoring force caused by a build-up in pressure within the down-going cushion cell when the vehicle tilts. This pressure build-up results from the down-going cushion cell being supplied with air from the air curtains containing the cell ends, which curtains are reduced in height as the vehicle tilts and so become "over-strong" and contain surplus air which breaks away to enter the cushion cell.

A similar effect can be gained by fitting valve-operating devices 31, responsive to tilt, in the ducts 9 so as to control the mass flow of air through the ports 10 in order to create a pressure differential between the cushion cells.

In the modification illustrated in FIGURE 6, the upper portion 18c of a wall structure 5 is made of inextensible material and the spaces 22a, 22b, are divided by a panel 21a of the same material. The upper space 22a is completely sealed off and the wall 5 is moved up and down by means of a board 35 in contact with the portion 18c and pivotally attached to the vehicle body at 24. The board 35 is moved by an electrical actuator 36 under the control of the vehicle pilot through electrical signal lines 37. Inflation pressure within the space 22a tends to urge the wall 5 upwardly, against the board 25, and upward and downward movement of the wall structure 5 is effected by varying the loading imposed by the board on the upper portion 18c.

In a further modification, differential immersion is achieved by maintaining one of the wall structures 5 stationary whilst the other is moved. With reference to FIGURE 7, in the example illustrated therein, only the starboard wall structure 5 is movable, through the compressor 25, the port wall structure remaining stationary. This modification is suitable for vehicles where space limitations are paramount. A similar effect can be obtained by employing the wall-improving means 35, 36 of FIGURE 6.

In yet a further modification, differential immersion is achieved by moving both wall structures in the same direction but in differing amounts.

Although the above example has been confined to embodiments wherein the wall structures 5 are in contact with water under all normal operating conditions of the vehicle 1, the invention is also applicable to gas-cushion vehicles having wall structures which, under normal operating conditions of the vehicle, are maintained clear of the water. (For example, by means of curtains of air or other fluid issuing from the edges of the structures in known manner.)

I claim:

1. A gas-cushion vehicle for operation over water which, in operation, is supported above the surface of the water by at least one cushion of pressurised gas formed and contained beneath the vehicle body, comprising a pair of flexible wall structures for partially containing said cushion, said wall structures being of hollow, inflatable form, extending longitudinally along the sides of the vehicle body parallel to the fore and aft axis of the vehicle and projecting downwardly therefrom towards the water, the lower parts of said wall structures being adapted to dip into the water beneath the vehicle, actuating means for so distorting the wall structure on at least one side of the vehicle body that at least its lower part is moved towards and away from the water in order to vary the drag created by immersion thereof, wall means extending parallel to the fore and aft axis of the vehicle and dividing the cushion longitudinally into cushion cells, and means responsive to sideways tilt of the vehicle for varying the pressures of the cushion cells should the vehicle tilt to one side.

2. A vehicle as claimed in claim 1 wherin at least the lower parts of the wall structures on both sides of the vehicle body are movable towards and away from the water.

3. A vehicle as claimed in claim 1 including a gas curtain containing, at least in part, at least one end of each cushion cell.

4. A vehicle as claimed in claim 1 wherein at least part of the upper portions of the wall structures are of extensible material and define close, inflatable space, and said actuating means include means for varying the inflation pressure of said spaces and thereby extending the upper portions of said wall structures.

5. A vehicle as claimed in claim 1 wherein the upper portions of the wall structures define closed, inflatable spaces, and said actuating means include means for exerting a downward force of variable intensity on to the outer surfaces of said upper portions so that said upper portions distort.

6. A gas-cushion vehicle for operation over water which, in operation, is supported above the surface of the water by at least one cushion of pressurised gas formed and contained beneath the vehicle body, comprising a pair of flexible wall structures for partially containing said cushion, said wall structures being of hollow, inflatable form, extending longitudinally along the sides of the vehicle body parallel to the fore and aft axis of the vehicle and projecting downwardly therefrom towards the water, the lower parts of said wall structures being adapted to dip into the water beneath the vehicle, and actuating means for so distorting the wall structure on at least one side of the vehicle body that at least its lower part is moved towards and away from the water in order to vary the drag created by immersion thereof, the lower portions of the wall structures each comprising a plurality of separate wall members each having an outer portion constrained to resist outward deflection by cushion pressure by two side portions extending inwardly from the outer portion into the space bounded by the wall structure.

References Cited by the Examiner

UNITED STATES PATENTS

| | | | |
|---|---|---|---|
| 3,027,860 | 4/1962 | Priest | 114—67.1 |
| 3,146,752 | 9/1964 | Ford | 114—67.1 |
| 3,207,113 | 9/1965 | Tattersall | 114—67.1 |

MILTON BUCHLER, *Primary Examiner.*

A. H. FARRELL, *Assistant Examiner.*

UNITED STATES PATENT OFFICE
CERTIFICATE OF CORRECTION

Patent No. 3,319,592                                                  May 16, 1967

Rowland Delville Hunt

It is hereby certified that error appears in the above numbered patent requiring correction and that the said Letters Patent should read as corrected below.

Column 1, line 67, for "FIGURE 3 is similar to FIGURE 2 and illustrates" read -- FIGURE 4, --; column 2, line 51, for "application" read -- applications --; column 3, line 21, after "ensures" insert -- that --; line 39, for "22 and rotates" read -- 22a and rotate --; lines 41 and 42, strike out "20, so as to reduce the degree of immersion of the port- disposed --; column 4, line 60, for "close, inflatable space" read -- closed, inflatable spaces --; line 62, for "pressure" read -- pressures --.

Signed and sealed this 21st day of November 1967.

(SEAL)
Attest:

EDWARD M. FLETCHER, JR.                              EDWARD J. BRENNER
Attesting Officer                                       Commissioner of Patents